(12) United States Patent
Yazici et al.

(10) Patent No.: US 12,704,094 B2
(45) Date of Patent: Aug. 11, 2026

(54) MULTI-VALVE MODULATED CORE VENTILATION

(71) Applicant: Raytheon Technologies Corporation, Farmington, CT (US)

(72) Inventors: Murat Yazici, Glastonbury, CT (US); Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/137,898

(22) Filed: Apr. 21, 2023

(65) Prior Publication Data

US 2024/0352892 A1 Oct. 24, 2024

(51) Int. Cl.
*F02C 7/18* (2006.01)
*F02C 9/18* (2006.01)

(52) U.S. Cl.
CPC .................. *F02C 7/18* (2013.01); *F02C 9/18* (2013.01); *F05D 2260/20* (2013.01)

(58) Field of Classification Search
CPC .... F02C 7/12; F02C 7/18; F02C 7/185; F02C 9/18; F02C 9/52; F05D 2260/20; F05D 2270/3062; F01D 25/08; F01D 25/12; F01D 25/14
See application file for complete search history.

(56) References Cited

U.S. PATENT DOCUMENTS 5,357,742 A * 10/1994 Miller ........................ F02C 7/18 60/39.83
8,408,864 B2 4/2013 Fintescu
8,661,832 B2 * 3/2014 Griffin ................ F04D 27/0223 137/15.2
8,739,516 B2 6/2014 Bulin
9,816,438 B2 * 11/2017 Teia Dos Santos Medes Gomes .................... F02C 7/185
10,371,063 B2 * 8/2019 Moniz ..................... F01D 25/14
10,633,998 B2 * 4/2020 Suciu ........................ F02C 5/12
11,098,649 B2 8/2021 De Pau, Jr.
2010/0215481 A1 8/2010 Negulescu
(Continued)

OTHER PUBLICATIONS

EP Search Report for EP Patent Application No. 24171461.7 dated Sep. 16, 2024.

*Primary Examiner* — Devon C Kramer
*Assistant Examiner* — Sean V Meiller
(74) *Attorney, Agent, or Firm* — Getz Balich LLC

(57) ABSTRACT

A gas turbine engine is provided that includes fan, compressor, combustor, and turbine sections, an outer casing, an outside core annular region, and a fan air circulation system. The engine has a core gas path that is disposed radially inside of the outer casing. A fan bypass air duct is defined by inner and outer radial flow path boundaries. The outside core annular region is disposed radially between the outer casing and the inner radial boundary flow path boundary. The fan air circulation system has a plurality of inlet ports, valves, and exit ports. The fan air circulation system is configured such that a respective inlet port is in fluid communication with a respective valve, and the respective valve is in fluid communication with a respective exit port. Each valve is selectively controllable to control fan bypass air flow therethrough and into the outside core annular region.

15 Claims, 4 Drawing Sheets

(56) References Cited

U.S. PATENT DOCUMENTS

2012/0227375 A1* 9/2012 Badcock .................. F02C 7/18
60/262
2015/0260101 A1 9/2015 Teia Dos Santos Medes Gomes
2016/0298550 A1 10/2016 Kupratis
2017/0058776 A1* 3/2017 Ronan ...................... F02C 6/08
2018/0363492 A1 12/2018 Suciu
2019/0055889 A1 2/2019 Heims
2022/0049621 A1* 2/2022 Sawyers-Abbott ... F01D 25/162

* cited by examiner

MULTI-VALVE MODULATED CORE VENTILATION

BACKGROUND OF THE INVENTION

1. Technical Field

This disclosure relates to gas turbine engines in general, and to gas turbine engines with cooling for components disposed external to the core gas path of the engine in particular.

2. Background Information

A gas turbine engine (e.g., a turbofan engine) may be configured to produce thrust within a core gas path and by fan bypass air. Air drawn into a turbofan engine subsequently exits the fan section of the engine either passes into the "core" of the engine (e.g., through the compressor, combustor, and turbine sections) or passes through a bypass duct disposed radially outside of the core engine. In an ideal scenario, all of the air passing through the fan bypass duct would be dedicated to producing thrust. In reality, however, it is common to bleed some amount of fan air off of the fan bypass duct for a variety of different uses; e.g., for cooling purposes, for purging purposes, or the like. Fan air bled off of the fan bypass duct may provide a valuable function (e.g., cooling, purging, or the like) but once bled, it very often does not provide thrust. Hence, air bled off of the fan bypass duct very often undesirably decreases the thrust-specific fuel consumption (TSFC) of the engine.

A fan bypass air duct is typically defined by an outer flow path boundary and an inner flow path boundary. The outer flow path boundary may be formed by one or more inner radial panels of a nacelle in which the engine is disposed. The inner flow path boundary may be formed by one or more panels typically referred to as inner frame structure panels ("IFS" panels). The IFS panels collectively form an annular structure that is disposed radially outside of the outer casing of the engine. The IFS panels and the engine outer casing collectively define an annular region disposed outside of the core of the engine (referred to hereinafter as the "outside core annual region"). In many instances, a gas turbine engine will include components (e.g., fluid lines, actuators, sensors, harnesses, and the like-referred to hereinafter as "external components") that are disposed in the outside core annular region. During operation of the engine, significant thermal energy is developed within the core of the engine; e.g., within the compressor section, the combustor section, the turbine section, or any combination thereof. The thermal energy developed is particularly significant during certain operational phases; e.g., maximum power at take-off, and the like. Some amount of the thermal energy developed within the core of the engine is transferred to the outside core annular region. In many instances, an external component will have a maximum operating temperature, or the useful life of the external component will vary as a function of the ambient temperature (e.g., operating in a higher temperature environment may decrease the useful life of the external component).

What is needed is a system capable of providing an air temperature environment within the outside core annular region that is acceptable to external components, one that typically does not negatively affect the useful life of external components, one that avoids the need to use expensive high operating temperature capable external components, and one that is favorable with respect to the TSFC of the engine.

SUMMARY

According to an aspect of the present disclosure, a gas turbine engine is provided that includes fan, compressor, combustor, and turbine sections, an outer casing, an outside core annular region, and a fan air circulation system. The outer casing is disposed radially outside of the compressor, combustor, and turbine sections. The engine has a core gas path that extends through the compressor, combustor, and turbine sections. The core gas path is disposed radially inside of the outer casing. A fan bypass air duct is defined by inner and outer radial flow path boundaries. The outside core annular region is disposed radially between the outer casing and the inner radial boundary flow path boundary. The fan air circulation system has a plurality of inlet ports, a plurality of valves, and a plurality of exit ports. The fan air circulation system is configured such that a respective inlet port is in fluid communication with a respective valve, and the respective valve is in fluid communication with a respective exit port. Each respective valve is selectively controllable to control fan bypass air flow through the respective valve and into the outside core annular region.

In any of the aspects or embodiments described above and herein, each respective valve may be selectively controllable to at least a first operating configuration and a second operating configuration. The first operating configuration is associated with a first flow of fan bypass air through the respective valve and the second operating configuration is associated with a second flow of fan bypass air through the respective valve. The first flow of fan bypass air through the respective valve is different than the second flow of fan bypass air through the respective valve.

In any of the aspects or embodiments described above and herein, the first operating configuration may be a closed valve configuration and the first flow of fan bypass air through the respective valve is a substantially zero flow, and the second operating configuration may be an open valve configuration associated with the second flow of fan bypass air through the respective valve, and the second flow of fan bypass air is greater than the substantially zero flow.

In any of the aspects or embodiments described above and herein, the first operating configuration may be an open valve configuration and the second operating configuration may be an open valve configuration. The first flow of fan bypass air through the respective valve is volumetrically greater than the second flow of fan bypass air through the respective valve.

In any of the aspects or embodiments described above and herein, each respective valve may be selectively controllable to a plurality of open operating configurations, including a first open operating configuration and a second open operating configuration. The flow of fan bypass air through the respective valve in the first open operating configuration is volumetrically greater than the flow of fan bypass air through the respective valve in the second open operating configuration.

In any of the aspects or embodiments described above and herein, the fan air circulation system may be configured to control the plurality of valves in unison to cause each valve of the plurality of valves to be in the same operating configuration.

In any of the aspects or embodiments described above and herein, the fan air circulation system may be configured to individually control each valve.

In any of the aspects or embodiments described above and herein, the exit ports may be spaced apart from one another circumferentially.

In any of the aspects or embodiments described above and herein, the exit ports may be spaced equidistantly from one another.

In any of the aspects or embodiments described above and herein, the exit ports may be non-uniformly circumferentially spaced.

In any of the aspects or embodiments described above and herein, each of the inlet ports may be configured the same as the other inlet ports.

In any of the aspects or embodiments described above and herein, the plurality of inlet ports may include a first inlet port having a first configuration and a second inlet port having a second configuration, and the first configuration is different from the second configuration.

In any of the aspects or embodiments described above and herein, the engine may include an aft fan annular compartment defined in part by the outer casing and a firewall, and the plurality of exit ports may be disposed in the firewall.

In any of the aspects or embodiments described above and herein, the firewall may separate the aft fan annular compartment from the outside core annular region.

According to an aspect of the present disclosure, a method of cooling one or more external components of a gas turbine engine is provided. The gas turbine engine includes fan, compressor, combustor, and turbine sections, and an outer casing disposed radially outside of the compressor, combustor, and turbine sections. The gas turbine engine has a core gas path that extends through the compressor, combustor, and turbine sections. The core gas path is disposed radially inside of the outer casing. A fan bypass air duct is defined by inner and outer radial flow path boundaries. An outside core annular region is disposed radially between the outer casing and the inner radial boundary flow path boundary. The one or more external components are disposed in the outside core annular region. The method includes using a plurality of valves to selectively control a flow of fan bypass air from the fan bypass air duct to the outside core annular region, wherein each respective valve is in fluid communication with a respective inlet port and a respective exit port, and each respective valve is controllable to vary the flow of fan bypass air through the respective valve by moving from a first operating configuration to a second operating configuration.

In any of the aspects or embodiments described above and herein, the flow of fan bypass air through a respective valve in the first operating configuration may be volumetrically greater than the flow of fan bypass air through the respective valve in the second operating configuration.

In any of the aspects or embodiments described above and herein, the step of using the plurality of valves to selectively control the flow of fan bypass air includes controlling the plurality of valves in unison to cause each valve to be in the same operating configuration.

According to an aspect of the present disclosure a gas turbine engine is provided that includes fan, compressor, combustor, and turbine sections, an outer casing, an outside core annular region, a fan air circulation system, and a system controller. The outer casing is disposed radially outside of the compressor, combustor, and turbine sections. The engine has a core gas path that extends through the compressor, combustor, and turbine sections. The core gas path is disposed radially inside of the outer casing. A bypass fan air duct is defined by inner and outer radial flow path boundaries. The outside core annular region is disposed radially between the outer casing and the inner radial boundary flow path boundary. The fan air circulation system includes a plurality of inlet ports, a plurality of valves, and a plurality of exit ports. The fan air circulation system is configured to receive a flow of bypass fan air from the bypass fan air duct and to use a valve to selectively pass the received flow of bypass fan air into the outside core annular region. The system controller is in communication with the plurality of valves and a non-transitory memory storing instructions. The instructions when executed cause the system controller to selectively control each respective valve to control a flow of bypass fan air between a respective inlet port and a respective exit port and thereafter into the outside core annular region, the selective control including controlling each respective valve to pass a first said flow of bypass fan air during a first engine operating condition, and to pass a second said flow of bypass fan air during a second engine operating condition, wherein the first said flow of bypass fan air is volumetrically greater than the second said flow of bypass fan air.

In any of the aspects or embodiments described above and herein, the first engine operating condition may be a take-off condition and the second engine operating condition may be a cruise condition.

In any of the aspects or embodiments described above and herein, the selective control passage of the flow of bypass fan air into the outside core annular region may be based on a thermal environment within the outside core annular region.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
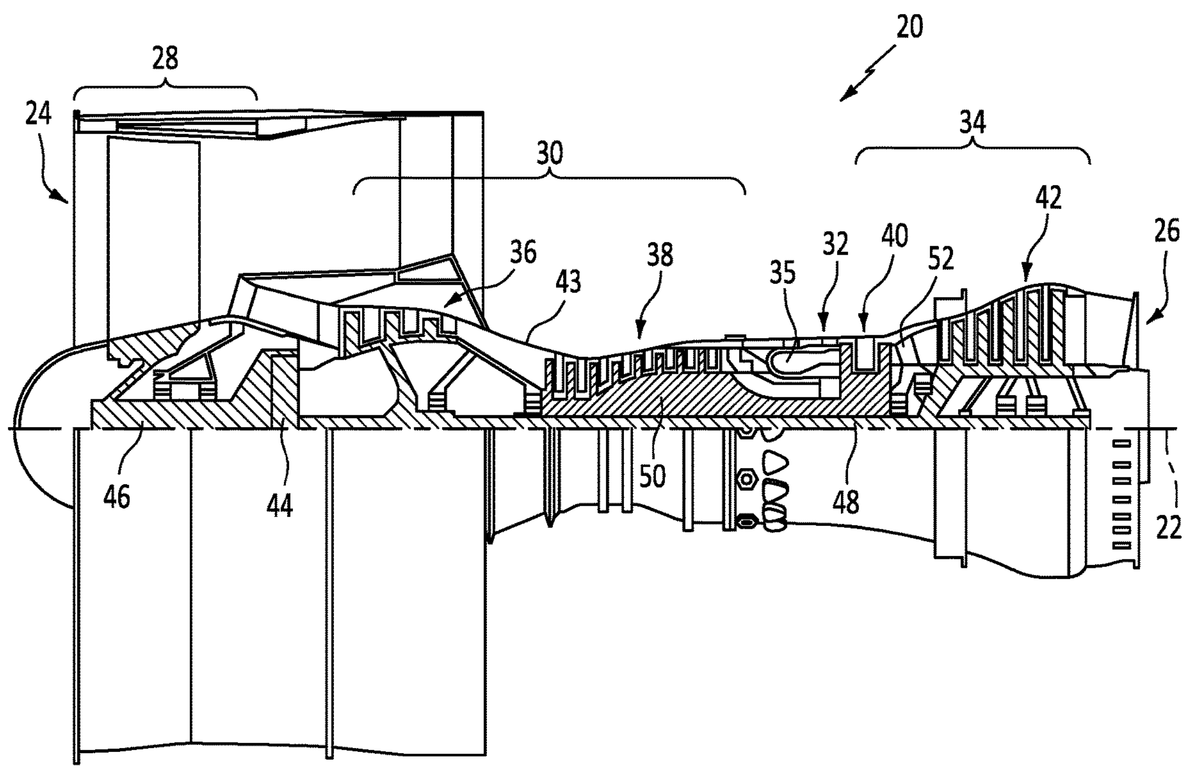
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes a combustor 35. The compressor section 30 includes a low-pressure compressor (LPC) 36 and a high-pressure compressor (HPC) 38. The turbine section 34 includes a high-pressure turbine (HPT) 40 and a low-pressure turbine (LPT) 42. The engine 20 may be described as having an outer casing 43 disposed radially outside of the compressor, a combustor, and turbine sections 30, 32, 34 that defines an outer radial boundary of the core gas path through the engine 20. The configuration of the outer casing 43 may vary along the core gas path; e.g., a first set of components forming the outer casing 43 within the compressor section 30, a different set of components forming the outer casing 43 within the combustor section 32, and so on. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 50. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration, including the two-spool engine configuration shown, and may be utilized with single spool gas turbine engines as well as three spool gas turbine engines and the like.

Figure 2:
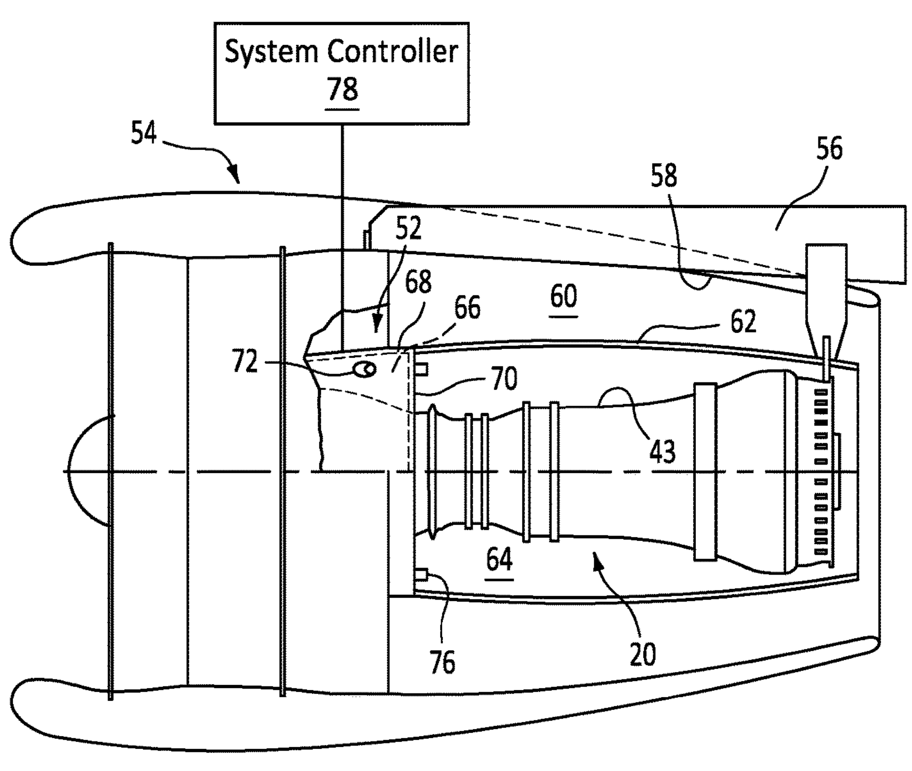
FIG. 2 is a diagrammatic sectional view of a present disclosure gas turbine engine embodiment.

FIG. 2 diagrammatically illustrates a gas turbine engine 20 embodiment generally like that shown in FIG. 1, modified with a fan air circulation system 52 according to an aspect of the present disclosure. FIG. 2 diagrammatically illustrates a nacelle structure 54 and a pylon structure 56. The nacelle 54 includes one or more inner radial panels that define the outer radial flow path boundary 58 of a fan bypass air duct 60. As will be detailed herein, one or more panels typically referred to as inner frame structure panels ("IFS" panels) may be used to define the inner radial flow path boundary 62 of the fan bypass air duct 60.

The engine 20 embodiment shown in FIG. 2 includes an annular region (i.e., the "outside core annular region 64") disposed between engine outer casing 43 and the inner radial flow path boundary 62 for the fan bypass air duct 60.

The engine 20 embodiment shown in FIG. 2 includes an aft fan annular compartment ("AF annular compartment 66") that is defined generally by a portion of the outer casing 43 (disposed radially outside of a compressor section 30), an annular aft inner diameter panel ("aft ID panel 68"), and a firewall 70. The aft ID panel 68 is disposed radially outside of and spaced apart from the outer casing 43. The aft ID panel 68 extends axially from the fan rotor stage and forms a part of the inner radial flow path boundary 62 for the fan bypass air duct 60. The firewall 70 is engaged with the outer casing 43 and the aft ID panel 68, extending therebetween in a generally radial plane. The AF annular compartment 66 is disposed forward of the outside core annular region 64.

The fan air circulation system 52 includes a plurality of inlet ports 72, a controllable valve 74 associated with each inlet port 72, and a plurality of exit ports 76. In some embodiments, the fan air circulation system 52 may include a system controller 78.

Figure 3:
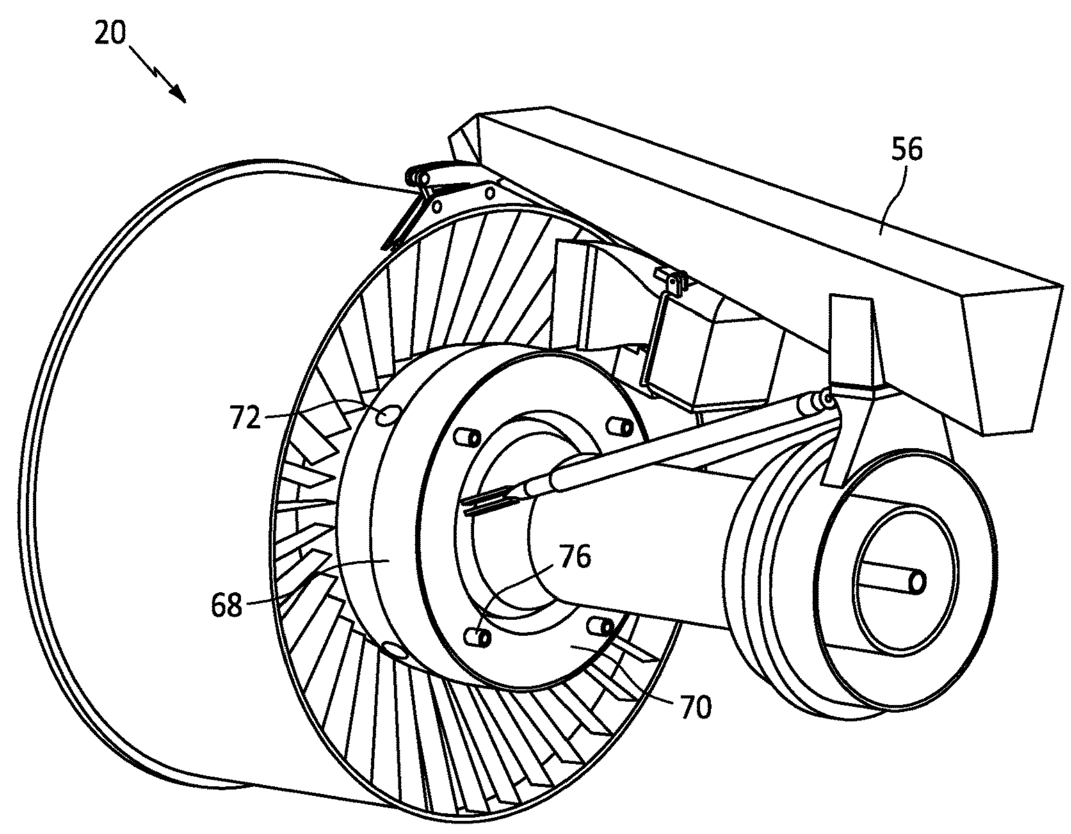
FIG. 3 is a diagrammatic perspective view of a gas turbine engine having a present disclosure fan air circulation system embodiment.
Figure 4:
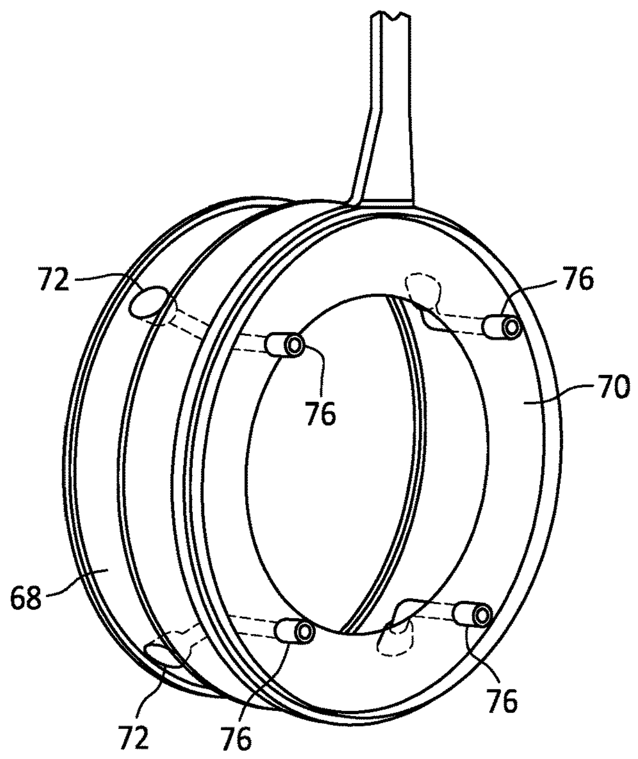
FIG. 4 is a diagrammatic perspective view of a fan air circulation system embodiment.
Figure 4A:
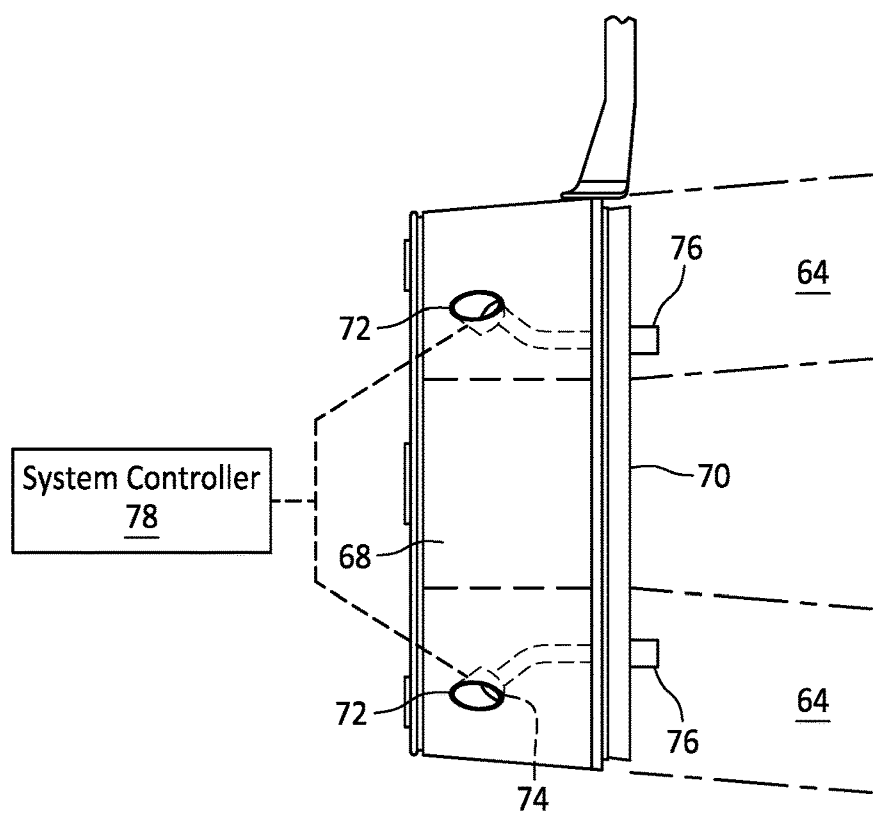
FIG. 4A is a diagrammatic side view of the system embodiment shown in FIG. 4.
Figure 4B:
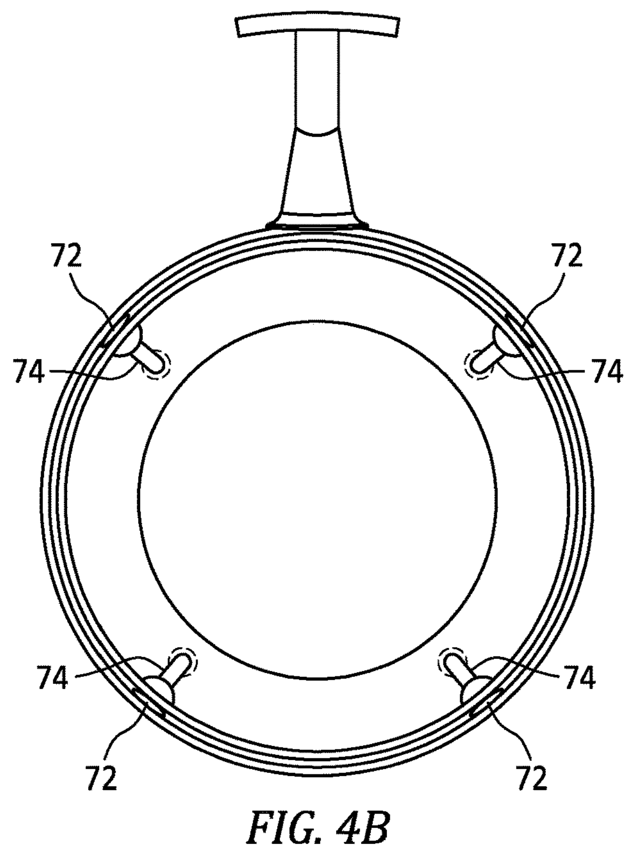
FIG. 4B is a diagrammatic view of system embodiment shown in FIG. 4, from a forward looking aft (FLA) perspective.
Figure 4C:
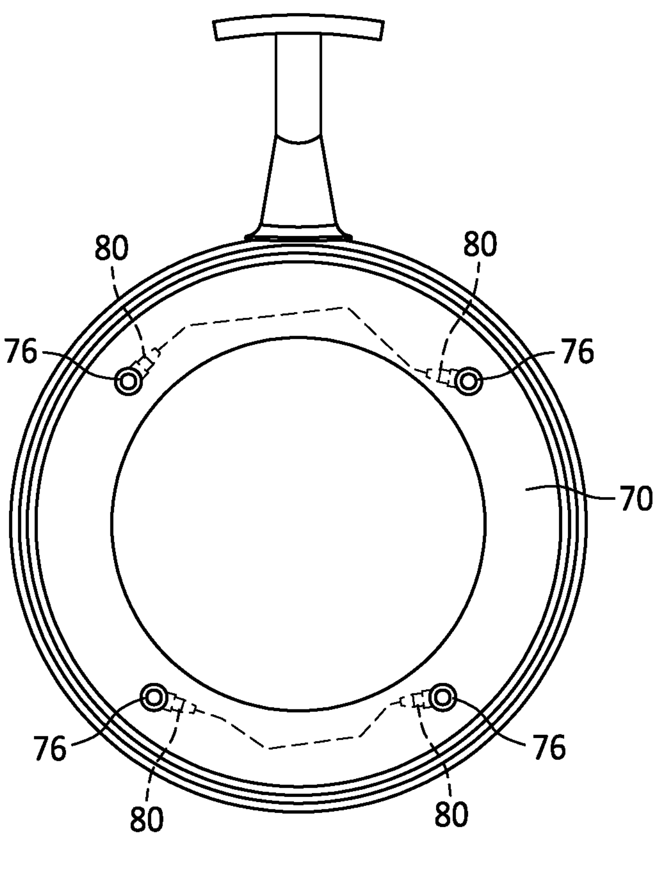
FIG. 4C is a diagrammatic view of system embodiment shown in FIG. 4, from an aft looking forward (ALF) perspective.

FIGS. 3-4C diagrammatically illustrate a fan air circulation system 52 that includes four (4) inlet ports 72. The present disclosure is not limited to including any particular number of inlet ports 72; i.e., the system may include fewer than four (4) inlet ports 72, or more than four (4) inlet ports 72. More than four (4) inlet ports 72 may be advantageous in some applications to facilitate a more circumferentially uniform flow of bypass fan air into the outside core annular region 64. To facilitate the description herein, however, the present disclosure will be described as having four inlet ports 72.

The inlet ports 72 are disposed in the aft ID panel 68 spaced apart from one another along the circumference of the aft ID panel 68 and the exit ports 76 are disposed with the firewall 70 spaced apart from one another along the circumference of the firewall 70. In the fan air circulation system 52 diagrammatically shown in FIGS. 3-4C, the inlet ports 72 are uniformly distributed around the circumference of the aft ID panel 68 and the exit ports are uniformly distributed around the circumference of the firewall 70; e.g., a first inlet port 72/first exit port 76 positioned at a forty-five degree position (e.g., 45° from top dead center—"TDC"), a second inlet port 72/second exit port 76 positioned at a one hundred and thirty-five degree (135°) position from TDC, a third inlet port 72/third exit port 76 positioned at a two hundred and twenty-five degree (225°) position from TDC, and a fourth inlet port 72/fourth exit port 76 positioned at a three hundred and fifteen degree (315°) position from TDC. In alternative embodiments, the inlet ports 72 and/or the exit ports 76 may be non-uniformly distributed; e.g., with more inlet ports 72 disposed in certain circumferential regions and fewer inlet ports 72 disposed in other circumferential regions, and/or with more exit ports 76 disposed in certain circumferential regions (that are aligned with regions of the outside core annular region 64 subject to higher thermal loads) and fewer exit ports 76 disposed in other circumferential regions (that are aligned with regions of the outside core annular region 64 subject to lower thermal loads).

In the fan air circulation system 52 diagrammatically shown in FIGS. 4 and 4A, each inlet port 72 is flush with the surface of the aft ID panel 68. Hence, each inlet port 72 is a cavity disposed in the outer surface of the aft ID panel 68. In some embodiments, an inlet port 72 may include structure extending out from the surface of the aft ID panel 68 to facilitate air flow into the inlet port 72.

In some embodiments, all of the inlet ports 72 may be identically configured. In some embodiments, the plurality of inlet ports 72 may include differently configured inlet ports 72; e.g., a first inlet port 72 having a first configuration (e.g., geometric shape, cross-sectional area, and the like) and a second inlet port 72 having a second configuration that is different from the first configuration.

Each inlet port 72 is in fluid communication with a fluid flow valve 74. The fluid communication of bypass air flow from the inlet port 72 to the valve 74 may be accomplished in a variety of different ways; e.g., tubing, piping, or the like. The present disclosure is not limited to any particular way of providing fluid communication between the inlet port 72 and the valve 74. As stated above, the present disclosure is not limited to including any particular number of inlet ports 72, and is not therefore limited to including any particular number of valves 74.

Figure 5:
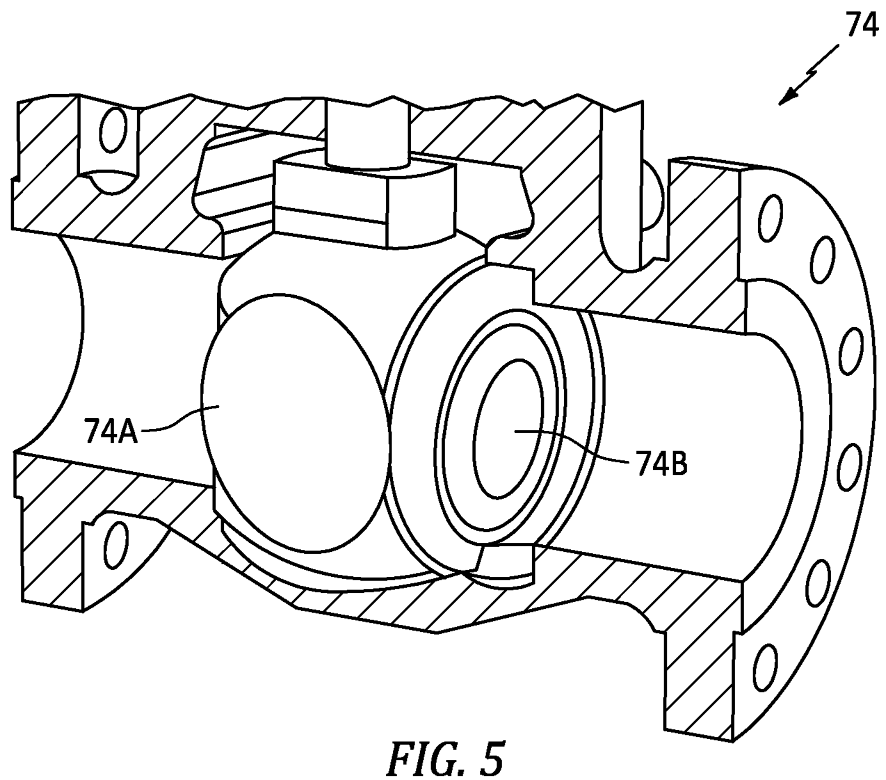
FIG. 5 is a diagrammatic sectioned view of a valve embodiment.

Each valve 74 is configured to selectively permit passage of fan bypass air flow through the valve 74 and subsequently into the outside core annular region 64. In some embodiments, each valve 74 may be adjustable between an entirely closed operating configuration wherein no fan bypass air flow passes through the valve 74 and an entirely open operating configuration wherein a maximum amount of fan bypass air flow passes through the valve 74. In some embodiments, the valve 74 may be adjustable in a plurality of partially open operating configurations (e.g., 25% open, 50% open, 75% open, and the like) wherein less than a maximum amount of fan bypass air flow passes through the valve 74. FIG. 5 diagrammatically illustrates an example of a valve type that may be used. In this example, the valve 74 can be adjusted to two different operating configurations: a) a first operating configuration that permits a first volumetric flow to pass through the valve 74 (via valve orifice 74A); and b) a second operating configuration that permits a second volumetric flow through the valve 74 (via valve orifice 74B), wherein the first volumetric flow is greater than the second volumetric flow; e.g., the first volumetric flow is a maximum flow and the second volumetric flow is a partial flow. In some embodiments, all of the valves 74 may be controlled in concert/unison; e.g., all valves 74 controlled to be at the same operational configuration. In some embodiments, the valves 74 may be controlled individually; e.g., a first valve 74 controlled to be at a first operational configuration, a second valve 74 controlled to be at a second operational configuration, wherein the volumetric flow permitted through the valve 74 at the first operational condition is different than that of the second operational configuration. In this manner, fan bypass air flow within circumferential regions of the outside core annular region 64 may be selectively varied. Examples of how those valve 74 operational configurations may be used in engine 20 operating conditions (e.g., take-off maximum thrust, cruise, and the like) are provided hereinafter. The present disclosure is not limited to any particular valve type. Each valve 74 may be actuated between operational configurations (e.g., closed, partially open, fully open, and the like) by an actuator 80. The present disclosure is not limited to any particular type of actuator 80; e.g., pneumatic, electric, hydraulic. The actuator 80 may itself be configured to produce valve operational configuration data (e.g., valve gate position) or an independent sensor may be used to provide valve operational configuration feedback.

Each exit port 76 is configured to permit fan bypass air flow to pass through the firewall 70 and into the outside core annular region 64 that is contiguous with the firewall 70. As stated above, the present disclosure is not limited to any particular number of inlet ports 72 and valves 74. In some embodiments, the present disclosure may include a single exit port 76 for each valve 74; e.g., see FIGS. 4 and 4A. In some embodiments, however, each valve 74 may be in fluid communication with more than one exit port 76. The number of exit ports 76 can be varied to produce a desirable distribution of fan bypass air into the outside core annular region 64; e.g., a greater number of exit ports 76 may facilitate a more uniform circumferential distribution of fan bypass air into the outside core annular region 64.

The exit ports 76 may be configured in a variety of different ways. For example, an exit port 76 may be configured to produce a stream of fan bypass air into the outside core annular region 64, or an exit port 76 may be configured to produce diffused fan bypass air flow into the outside core annular region 64, or the like. In some embodiments, the exit ports 76 may be configured to direct the fan bypass air flow passing therethrough in a direction that is substantially parallel to the axial centerline 22 of the engine 20. In some embodiments, the exit ports 76 may be configured to direct the fan bypass air flow passing therethrough at an angle relative to the axial centerline 22 of the engine 20 to create a swirling airflow within the outside core annular region 64.

In some embodiments, all of the exit ports 76 may be identically configured. In some embodiments, the plurality of exit ports 76 may include differently configured exit ports 76; e.g., a first exit port 76 having a first configuration (e.g., geometric shape, cross-sectional area, and the like), a second exit port 76 having a second configuration that is different from the first configuration, and so on.

As will be described herein, a gas turbine engine 20 will typically include components (e.g., fluid lines, actuators, sensors, harnesses, and the like-referred to hereinafter as "external components") that are disposed in the outside core annular region 64. The heat transfer path from the engine core to the outside core annular region 64 may not be circumferentially uniform. The external components may not be uniformly distributed around the circumference of the engine 20. Some external engine components may benefit from a greater amount of cooling flow than other external components; e.g., a first external component having a greater thermal tolerance than a second external component. The present disclosure fan air circulation system 52 provides a mechanism that can be used to customize the distribution of fan bypass air flow to better meet the cooling needs of the external components. For example, in the system diagrammatically shown in FIGS. 3-4C, the four (4) exit ports 76 are shown uniformly distributed around the circumference of the outside core annular region 64. In alternative embodiments, the exit ports 76 may be non-uniformly distributed; e.g., with more exit ports 76 disposed in certain circumferential regions (that are aligned with regions of the outside core annular region 64 subject to higher thermal loads) and fewer exit ports 76 disposed in other circumferential regions (that are aligned with regions of the outside core annular region 64 subject to lower thermal loads).

In those present disclosure system embodiments that include a system controller 78, the controller 78 is in communication with other system components, such as the valves 74, sensors, and one or more controllers associated with the aircraft; e.g., the FADEC. The system controller 78 may be in communication with these components to control and/or receive signals therefrom to perform the functions described herein. The system controller 78 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The system controller 78 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller 78 may include, or may be in communication with, an input device that enables a user to enter data and/or instructions, and may include, or be in communication with, an output device. Communications between the system controller 78 and other system components may be via a hardwire connection or via a wireless connection.

In the operation of a gas turbine engine 20 with the present disclosure system, air drawn into the engine 20 passes through the fan section 28 of the engine 20 and either passes into the "core" of the engine 20 (e.g., through the compressor, combustor, and turbine sections 30, 32, 34) or passes into fan bypass air duct 60 disposed radially outside of the engine core. In an ideal scenario, all of the air passing through the fan bypass air duct 60 would be dedicated to producing thrust. In reality, however, it is common to bleed some amount of fan bypass air off of the fan bypass air duct 60 for a variety of different uses; e.g., for cooling purposes, for purging purposes, or the like. Fan bypass air bled off of the fan bypass air duct 60 may provide a valuable function (e.g., cooling, purging, or the like) but once bled, it very often does not provide thrust. Hence, air bled off of the fan bypass air duct 60 very often undesirably decreases the thrust-specific fuel consumption (TSFC) of the engine 20.

The present disclosure system provides a fan air circulation system 52 that is configurable and/or can be controlled to provide cooling air into the outside core annular region 64 for cooling external components of the engine 20. In particular, the present disclosure system fan air circulation system 52 is controllable to selectively provide varying amounts of fan bypass air for cooling purposes. In an engine operating condition wherein high thermal loads are produced (e.g., maximum power at take-off, or the like), the present disclosure system fan air circulation system 52 can be controlled (e.g., valves 74 fully open) to deliver a maximum amount of fan bypass air for cooling purposes. In an engine operating condition where lower thermal loads are produced (e.g., at cruise, or the like), the present disclosure system fan air circulation system 52 can be controlled (e.g., valves 74 partially open) to deliver less than a maximum amount of bypass fan air for cooling purposes; i.e., an optimum amount of cooling air. A desired volumetric flow of fan bypass air for cooling purposes may be based on empirical data (e.g., data collected for various operating conditions) or based on real-time sensor data, or any combination thereof, which is in turn used by the system controller 78 to control the valves 74 to produce the desired volumetric flow of fan bypass air for cooling purposes. The stored instructions may relate engine operating conditions to temperatures within the outside core annular region 64 as a function of engine operating conditions, engine operating conditions as a function of time, may consider maximum allowable temperatures for external components, and dictate the amount of cooling air required as a function thereof. As stated herein, the stored instructions may be based on empirical data, or real-time sensor data, or any combination thereof. If the system controller 78 utilizes empirical data, the aforesaid data may be within the system controller 78 stored instructions, or the stored instructions may be based on the empirical data. As an example, the system controller 78 may determine an appropriate valve configuration (to produce the desired volumetric flow of fan bypass air for cooling purposes) based on parameters such as the thrust setting of the engine, the amount of time at a particular thrust setting, the altitude of the aircraft, the ambient air temperature, predetermined maximum external component temperatures, and the like. As detailed herein, the aforesaid ability to selectively produce the desired volumetric flow of fan bypass air for cooling purposes may be implemented globally (i.e., all of the valves 74 actuating in concert) or regionally (valves 74 controlled to produce different flow in different regions-higher cooling demand, higher flow; lower cooling demand, lower flow). In this manner, only the amount of air that is required for cooling is bled off of the fan bypass air duct 60. The decrease in the amount of fan bypass air bled off is understood to make an appreciable difference in the engine's TSFC. Furthermore, configurations and/or positions of the present disclosure exit ports 76 that deliver the desired amount of cooling air at the desired circumferential position are also understood to minimize cooling air waste (i.e., cooling air delivered where it is not needed). As a result, the amount of fan bypass air bled off is understood to be decreased and the engine's TSFC thereby increased.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A gas turbine engine, comprising:

a fan section;

a compressor section;

a combustor section;

a turbine section;

an outer casing disposed radially outside of the compressor section, the combustor section, and the turbine section with respect to an axial centerline of the gas turbine engine;

a core gas path that extends through the compressor section, the combustor section, and the turbine section to a core gas path exhaust, the core gas path disposed radially inside of the outer casing;

a fan bypass air duct extending between and defined by an outer radial flow path boundary and an inner radial flow path boundary, the outer radial flow path boundary comprising one or more inner radial panels of a nacelle, the gas turbine engine disposed in the nacelle, the inner radial flow path boundary including one or more inner frame structure panels;

an outside core annular region, the outside core annular region defined by and radially disposed between the outer casing and the inner frame structure panels of the inner radial flow path boundary, wherein the outside core annular region extends to the core gas path exhaust;

an aft fan annular compartment, the aft fan annular compartment defined by a portion of the outer casing, an annular aft inner diameter panel, and a firewall, the firewall engaged with the outer casing and the annular aft inner diameter panel, the firewall extending in a radial plane between the outer casing and the annular inner diameter panel, the annular aft inner diameter panel radially outside of and spaced apart from the outer casing, and the annular aft inner diameter panel forming a part of the inner radial flow path boundary; and a fan air circulation system, the fan circulation system comprising a plurality of inlet ports, the inlet ports disposed along a circumference of the annular aft inner diameter panel, the fan air circulation system further comprising a plurality of valves and a plurality of exit ports, the exit ports disposed along a circumference of the firewall, wherein the fan air circulation system is configured such that a respective said inlet port is in fluid communication with a respective valve, and said respective valve is in fluid communication with at least one respective said exit port, and each respective exit port is in fluid communication with the outside core annular region;

wherein each respective valve is selectively controllable to control a flow of fan bypass air through the respective valve, into the outside core annular region at the firewall, and thereafter out of the engine from the outside core annular region, wherein each respective exit port is configured to direct the flow of fan bypass air at an angle relative to the axial centerline to create a swirling airflow within the outside core annular region; and wherein a valve of the plurality of valves is in fluid communication with more than one of the plurality of exit ports.

2. The gas turbine engine of claim 1, wherein each respective valve is selectively controllable to at least a first operating configuration and a second operating configuration, wherein the first operating configuration is associated with a first flow of fan bypass air through the respective valve and the second operating configuration is associated with a second flow of fan bypass air through the respective valve, and the first flow of fan bypass air through the respective valve is different than the second flow of fan bypass air through the respective valve.

3. The gas turbine engine of claim 1, wherein each respective valve is selectively controllable to at least a first operating configuration and a second operating configuration, wherein the first operating configuration is a closed valve configuration, and the second operating configuration is an open valve configuration.

4. The gas turbine engine of claim 2, wherein the first operating configuration is a first open valve configuration and the second operating configuration is a second open valve configuration, and wherein the first flow of fan bypass air through the respective valve is volumetrically greater than the second flow or a substantially zero flow of fan bypass air through the respective valve.

5. The gas turbine engine of claim 1, wherein each respective valve is selectively controllable to a plurality of open operating configurations, including a first open operating configuration and a second open operating configuration, and wherein the flow of fan bypass air through the respective valve in the first open operating configuration is volumetrically greater than the flow of fan bypass air through the respective valve in the second open operating configuration.

6. The gas turbine engine of claim 1, wherein the exit ports are spaced equidistantly from one another.

7. The gas turbine engine of claim 1, wherein the exit ports are non-uniformly circumferentially spaced.

8. The gas turbine engine of claim 1, wherein each of the inlet ports is configured the same as the other said inlet ports.

9. The gas turbine engine of claim 1, wherein the firewall separates the aft fan annular compartment from the outside core annular region.

10. A method of cooling one or more external components of a gas turbine engine, the gas turbine engine including a fan section, a compressor section, a combustor section, a turbine section, an outer casing disposed radially outside of the compressor section, the combustor section, and the turbine section with respect to an axial centerline of the gas turbine engine, a core gas path that extends through the compressor section, the combustor section, and the turbine section to a core gas path exhaust, the core gas path disposed radially inside of the outer casing; a fan bypass air duct extending between and defined by an outer radial flow path boundary and an inner radial flow path boundary, the outer radial flow path boundary comprising one or more inner radial panels of a nacelle, the gas turbine engine disposed in the nacelle, the inner radial flow path boundary including one or more inner frame structure panels; an outside core annular region, the outside core annular region defined by and radially disposed between the outer casing and the inner frame structure panels of the inner radial flow path boundary, wherein the outside core annular region extends to the core gas path exhaust; an aft fan annular compartment, the aft fan annular compartment defined by a portion of the outer casing, an annular aft inner diameter panel, and a firewall, the firewall engaged with the outer casing and the annular aft inner diameter panel, the firewall extending in a radial plane between the outer casing and the annular inner diameter panel, the annular aft inner diameter panel radially outside of and spaced apart from the outer casing, the annular aft inner diameter panel forming a part of the inner radial flow path boundary, and the annular aft inner diameter panel comprising a plurality of inlet ports, and the firewall comprising a plurality of exit ports, the method comprising:

using a plurality of valves to selectively control a flow of fan bypass air received from the fan bypass air duct into the outside core annular region at the firewall and to exit the gas turbine engine from the outside core annular region, wherein each respective valve is in fluid communication with a respective inlet port among the plurality of inlet ports, wherein each respective valve is in fluid communication with at least one respective exit port, wherein each respective exit port is in fluid communication with the outside core annular region, wherein each said exit port is configured to direct the flow of fan bypass air at an angle relative to the axial centerline to create a swirling airflow within the outside core annular region, and wherein each respective valve is controllable to vary the flow of fan bypass air through the respective valve by moving from a first operating configuration to a second operating configuration;

wherein a valve of the plurality of valves is in fluid communication with more than one of the plurality of exit ports.

11. The method of claim 10, wherein the flow of fan bypass air through a respective valve in the first operating configuration is volumetrically greater than the flow of fan bypass air through the respective valve in the second operating configuration.

12. The method of claim 10, wherein the step of using the plurality of valves to selectively control the flow of fan bypass air includes controlling the plurality of valves in unison to cause each said valve of the plurality of valves to be in the same operating configuration.

13. A gas turbine engine, comprising:

a fan section;

a compressor section;

a combustor section;

a turbine section;

an outer casing disposed radially outside of the compressor section, the combustor section, and the turbine section with respect to an axial centerline of the gas turbine engine;

a core gas path that extends through the compressor section, the combustor section, and the turbine section to a core gas path exhaust, the core gas path disposed radially inside of the outer casing;

a fan bypass air duct extending between and defined by an outer radial flow path boundary and an inner radial flow path boundary, the outer radial flow path boundary comprising one or more inner radial panels of a nacelle, the gas turbine engine disposed in the nacelle, the inner radial flow path boundary including one or more inner frame structure panels;

an outside core annular region, the outside core annular region defined by and radially disposed between the outer casing and the inner frame structure panels of the inner radial flow path boundary, wherein the outside core annular region extends to the core gas path exhaust;

an aft fan annular compartment, the aft fan annular compartment defined by a portion of the outer casing, an annular aft inner diameter panel, and a firewall, the firewall engaged with the outer casing and the annular aft inner diameter panel, the firewall extending in a radial plane between the outer casing and the annular inner diameter panel, the annular aft inner diameter panel radially outside of and spaced apart from the outer casing, and the annular aft inner diameter panel forming a part of the inner radial flow path boundary; and a fan air circulation system, the fan air circulation system including a plurality of inlet ports disposed in the annular aft inner diameter panel and spaced apart from each other along a circumference of the annular aft inner diameter panel, a plurality of valves, and a plurality of exit ports, the exit ports disposed along a circumference of the firewall, wherein each said exit port is in fluid communication with the outside core annular region and the fan air circulation system is configured to receive a flow of fan bypass air from the fan bypass air duct and using a respective valve of the plurality of valves to selectively pass the received flow of fan bypass air into the outside core annular region at the firewall and thereafter exhaust from the gas turbine engine from the outside core annular region, and wherein each said exit port is configured to direct the flow of fan bypass air at an angle relative to the axial centerline to create a swirling airflow within the outside core annular region; and a system controller in communication with the plurality of valves and a non-transitory memory storing instructions, which instructions when executed cause the system controller to:

selectively control each respective valve of the plurality of valves to control the flow of fan bypass air between a respective inlet port of the plurality of inlet ports and at least one respective exit port of the plurality of exit ports and thereafter into the outside core annular region, the selective control including controlling each respective valve to pass a first said flow of fan bypass air during a first engine operating condition, and to pass a second said flow of fan bypass air during a second engine operating condition, wherein the first said flow of fan bypass air is volumetrically greater than the second said flow of fan bypass air;

wherein a valve of the plurality of valves is in fluid communication with more than one of the plurality of exit ports.

14. The gas turbine engine of claim 13, wherein the first engine operating condition is a take-off condition and the second engine operating condition is a cruise condition.

15. The gas turbine engine of claim 13, wherein the selective control of the flow of fan bypass air into the outside core annular region is based on a thermal environment within the outside core annular region.

* * * * *